(12) United States Patent
Guralnik et al.

(10) Patent No.: US 8,224,763 B2
(45) Date of Patent: Jul. 17, 2012

(54) SIGNAL MANAGEMENT SYSTEM FOR BUILDING SYSTEMS

(75) Inventors: Valerie Guralnik, Mound, MN (US); Liana Maria Kiff, Minneapolis, MN (US); Michelle Raymond, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 523 days.

(21) Appl. No.: 12/463,613

(22) Filed: May 11, 2009

(65) Prior Publication Data
US 2010/0287130 A1 Nov. 11, 2010

(51) Int. Cl.
*G06F 17/00* (2006.01)
*G06N 5/02* (2006.01)

(52) U.S. Cl. ......................................................... 706/47
(58) Field of Classification Search .................. None
See application file for complete search history.

(56) References Cited

U.S. PATENT DOCUMENTS

| | | | |
|---|---|---|---|
| 4,375,637 A | 3/1983 | Desjardins | |
| 4,816,208 A | 3/1989 | Woods et al. | |
| 5,042,265 A | 8/1991 | Baldwin et al. | |
| 5,161,387 A | 11/1992 | Metcalfe et al. | |
| 5,385,297 A | 1/1995 | Rein et al. | |
| 5,390,206 A | 2/1995 | Rein et al. | |
| 5,768,119 A | 6/1998 | Havekost et al. | |
| 5,929,761 A | 7/1999 | Van der Laan et al. | |
| 5,946,303 A | 8/1999 | Watson et al. | |
| 5,955,946 A | 9/1999 | Beheshti et al. | |
| 6,124,790 A | 9/2000 | Golov et al. | |
| 6,178,362 B1 | 1/2001 | Woolard et al. | |
| 6,185,483 B1 | 2/2001 | Drees | |
| 6,223,544 B1 | 5/2001 | Seem | |
| 6,295,527 B1 | 9/2001 | McCormack et al. | |
| 6,314,328 B1 | 11/2001 | Powell | |
| 6,351,213 B1 | 2/2002 | Hirsch | |
| 6,356,282 B2 | 3/2002 | Roytman et al. | |
| 6,420,968 B1 | 7/2002 | Hirsch | |
| 6,430,712 B2 | 8/2002 | Lewis | |
| 6,473,407 B1 | 10/2002 | Ditmer et al. | |
| 6,492,901 B1 | 12/2002 | Ridolfo | |

(Continued)

FOREIGN PATENT DOCUMENTS
WO  WO 01/97146  12/2001

(Continued)

OTHER PUBLICATIONS

Amani et al. "A Case-Based Reasoning Method for Alarm Filtering and Correlation in Telecommunication Networks", CCGEI, 2005, pp. 2176-2180.*

(Continued)

*Primary Examiner* — Alan Chen
*Assistant Examiner* — Li-Wu Chang
(74) *Attorney, Agent, or Firm* — Seager, Tufte & Wickhem, LLC

(57) ABSTRACT

A system and approach for efficient algorithmic signal management for buildings. When a set of signals is received, attributes of the signals may be extracted from a database. The attributes of the signals may be matched against the rule conditions in the database. The matches may be compared to the rules to find the rules which have all of the conditions satisfied. These rules may be executed to modify the further processing of the signals. A signal for instance may be an alarm.

19 Claims, 13 Drawing Sheets

U.S. PATENT DOCUMENTS

| | | | |
|---|---|---|---|
| 6,535,122 B1 | 3/2003 | Bristol | |
| 6,549,135 B2 | 4/2003 | Singh et al. | |
| 6,662,235 B1 * | 12/2003 | Callis et al. | 719/318 |
| 6,675,591 B2 | 1/2004 | Singh et al. | |
| 6,681,156 B1 | 1/2004 | Weiss | |
| 6,690,980 B2 | 2/2004 | Powell | |
| 6,813,587 B2 | 11/2004 | McIntyre et al. | |
| 6,816,811 B2 | 11/2004 | Seem | |
| 6,870,141 B2 | 3/2005 | Damrath et al. | |
| 6,879,253 B1 | 4/2005 | Thuillard | |
| 6,892,546 B2 | 5/2005 | Singh et al. | |
| 6,919,809 B2 | 7/2005 | Blunn et al. | |
| 6,947,972 B2 | 9/2005 | Chun | |
| 6,955,302 B2 | 10/2005 | Erdman, Jr. | |
| 6,973,627 B1 | 12/2005 | Appling | |
| 6,990,821 B2 | 1/2006 | Singh et al. | |
| 7,024,283 B2 | 4/2006 | Bicknell | |
| 7,062,389 B2 | 6/2006 | Johnson et al. | |
| 7,068,931 B2 | 6/2006 | Tokunaga | |
| 7,069,181 B2 | 6/2006 | Jerg et al. | |
| 7,085,674 B2 | 8/2006 | Iwasawa | |
| 7,113,085 B2 | 9/2006 | Havekost | |
| 7,171,287 B2 | 1/2007 | Weiss | |
| 7,243,044 B2 | 7/2007 | McCalla | |
| 7,250,856 B2 | 7/2007 | Havekost et al. | |
| 7,277,018 B2 | 10/2007 | Reyes et al. | |
| 7,345,580 B2 | 3/2008 | Akamatsu et al. | |
| 7,457,869 B2 | 11/2008 | Kernan | |
| 7,460,020 B2 | 12/2008 | Reyes et al. | |
| 7,596,613 B2 | 9/2009 | Silverthorne et al. | |
| 7,653,459 B2 | 1/2010 | Pouchak et al. | |
| 7,819,334 B2 | 10/2010 | Pouchak et al. | |
| 7,826,929 B2 | 11/2010 | Wacker | |
| 2003/0101009 A1 | 5/2003 | Seem | |
| 2003/0171851 A1 | 9/2003 | Brickfield et al. | |
| 2004/0143510 A1 | 7/2004 | Haeberle et al. | |
| 2005/0038571 A1 | 2/2005 | Brickfield et al. | |
| 2005/0043862 A1 | 2/2005 | Brickfield et al. | |
| 2005/0193285 A1 | 9/2005 | Jeon | |
| 2005/0203490 A1 | 9/2005 | Simonson | |
| 2006/0136558 A1 | 6/2006 | Sheehan et al. | |
| 2006/0168013 A1 | 7/2006 | Wilson et al. | |
| 2006/0219473 A1 * | 10/2006 | Boland et al. | 181/139 |
| 2006/0253205 A1 | 11/2006 | Gardiner | |
| 2008/0010049 A1 | 1/2008 | Pouchak et al. | |
| 2008/0016493 A1 | 1/2008 | Pouchak et al. | |
| 2008/0115153 A1 | 5/2008 | Brindle | |
| 2008/0125914 A1 | 5/2008 | Wacker | |
| 2009/0113037 A1 | 4/2009 | Pouchak | |
| 2010/0100583 A1 | 4/2010 | Pouchak | |
| 2010/0106543 A1 | 4/2010 | Marti | |
| 2010/0131653 A1 | 5/2010 | Dharwada et al. | |
| 2010/0131877 A1 | 5/2010 | Dharwada et al. | |
| 2011/0010654 A1 | 1/2011 | Raymond et al. | |

FOREIGN PATENT DOCUMENTS

| | | |
|---|---|---|
| WO | WO 02/052432 | 7/2002 |
| WO | WO 03/090038 | 10/2003 |
| WO | WO 2004/053772 | 6/2004 |
| WO | WO 2004/055608 | 7/2004 |
| WO | WO 2004/070999 | 8/2004 |
| WO | WO 2005/020167 | 3/2005 |
| WO | WO 2006/048397 | 5/2006 |
| WO | WO 2007/024622 | 3/2007 |
| WO | WO 2007/024623 | 3/2007 |
| WO | WO 2007/027685 | 3/2007 |
| WO | WO 2007/082204 | 7/2007 |

OTHER PUBLICATIONS

Adobe Acrobat 6.0 Standard, Version 6.0.2, Screenshots, 2 pages, May 18, 2004.
U.S. Appl. No. 12/643,865, filed Dec. 21, 2009.
U.S. Appl. No. 12/703,476, filed Feb. 10, 2010.
U.S. Appl. No. 12/722,364, filed Mar. 11, 2010.
U.S. Appl. No. 12/792,547, filed Jun. 2, 2010.
U.S. Appl. No. 12/822,997, filed Jun. 24, 2010.
U.S. Appl. No. 12/977,701, filed Dec. 23, 2010.
Honeywell Spyder Bacnet User's Guide, 242 pages, Revised Jul. 2009.
Honeywell Spyder User's Guide 202 pages, Released Jul. 2007.
http://blogs.msdn.com/b/khen1234/archive/2005/05/11/416392.aspx, "Regular Expressions in T-SQL," 4 pages, May 11, 2005.
http://en.wikipedia.org/wiki/JAR_(file_format), "JAR (file Format)—Wikipedia, the Free Encyclopedia," 3 pages, printed Dec. 26, 2009.
http://www.google.com/maps, "Google Maps, Pin Location," 1 page, prior to Nov. 21, 2008.
Microsoft Word Screen Shots, 2 pages, prior to Nov. 21, 2008.
Siemens, BACnet for DESIGO 27 Pages, prior to Dec. 30, 2009.
Tridium, "NiagaraAX Product Model Overview," 7 pages, 2005.
Tridium, "Tridium & Niagara Framework Overview," 9 pages, prior to Oct. 28, 2008.

* cited by examiner

Structural_Entity_Types ~11

| ATTR_ID | StructEntityType |
|---|---|
| 1 | Customer |
| 2 | Site |
| 3 | Unit |
| 4 | Module |
| 125 | Executive |
| 345 | JACE |

*Figure 4*

Filter_Val_Char /12

| FILTER_ID | ATTR_ID | COL_NAME | VALUE |
|---|---|---|---|
| 1 | 1 | Name | Circuit |
| 2 | 4 | Name | EHM 05 |
| 3 | 2 | Name | RDXE M Slave |

*Figure 5*

Rule_Table

| RULE_ID | FILTER_ID | ORDER | REQUIRED_MATCH_COUNT | SQL_ACTION |
|---|---|---|---|---|
| 1 | 1 | | 2 | UPDATE Priority_FK = 3 |
| 1 | 2 | | 2 | UPDATE Priority_FK = 3 |
| 2 | 25 | | 1 | ... |
| 123 | 1 | | 2 | ... |
| 123 | 2 | | 2 | ... |

*Figure 6*

Filter_Tbl_Char

| ALARM_ID | FILTER_ID | ATTR_ID | COL_NAME | VALUE |
|---|---|---|---|---|
| 77570 | 1 | 10 | Name | WI |
| 77570 | 1 | 10 | Name | MN |
| 77570 | 1 | 10 | Name | IA |
| 77570 | 1 | 10 | Name | IL |
| 77570 | 1 | 10 | Name | MI |
| 77570 | 2 | 7 | Name | Comp |

*Figure 7*

New_Alarm_Values_Char /15

| ALARM_ID | ATTR_ID | COL_NAME | VALUE |
|---|---|---|---|
| 777570 | 11 | Name | Circuit City |
| 777570 | 1 | Name | Master Control |
| 777570 | 10 | Name | N. Olmstead, OH |
| 777570 | 2 | Name | RT 2 Comp Disks* |
| 777570 | 100 | Name | Cool 2 |
| 777570 | 7 | Name | RT 2 Comp Disks* |
| 777570 | 99 | Name | Cool 2 |

*Figure 8*

```
SELECT RULE_ID, ALARM_ID, REQUIRED_MATCH_COUNT, COUNT(RULE_ID) AS FOUND_MATCH_COUNT                    ⎫
INTO #temp_FOUND_MATCHES                                                                              ⎪
FROM RULE_TBL,                                                                                        ⎪
    (SELECT FILTER_ID, ALARM_ID                                                                       ⎪
     FROM FILTER_TBL_NUM                                                                              ⎬ 21
     INNER JOIN NEW_ALARM_VALUES_NUM                                                                  ⎪
     ON FILTER_TBL_NUM.ATTR_ID = NEW_ALARM_VALUES_NUM.ATTR_ID                                         ⎪
     AND FILTER_TBL_NUM.COND = NEW_ALARM_VALUES_NUM.VAL                                               ⎪
     AND FILTER_TBL_NUM.COL_NAME = NEW_ALARM_VALUES_NUM.COL_NAME                                      ⎭

UNION ALL

SELECT FILTER_ID, ALARM_ID                                                                       ⎫
     FROM FILTER_TBL_CHAR                                                                             ⎪
     INNER JOIN NEW_ALARM_VALUES_CHAR                                                                 ⎪
     ON FILTER_TBL_CHAR.ATTR_ID = NEW_ALARM_VALUES_CHAR.ATTR_ID                                       ⎬ 22
     AND NEW_ALARM_VALUES_CHAR.VAL LIKE ('%' + FILTER_TBL_CHAR.COND + '%')                            ⎪
     AND FILTER_TBL_CHAR.COL_NAME = NEW_ALARM_VALUES_CHAR.COL_NAME)                                   ⎪
     as #tempMatch                                                                                    ⎪
WHERE RULE_TBL.FILTER_ID = #tempMatch.FILTER_ID                                                       ⎪
GROUP BY RULE_ID, ALARM_ID, REQUIRED_MATCH_COUNT                                                      ⎭

SELECT RULE_ID, ALARM_ID                                                                              ⎫
FROM #temp_FOUND_MATCHES                                                                              ⎬ 23
WHERE FOUND_MATCH_COUNT = REQUIRED_MATCH_COUNT                                                        ⎭

TRUNCATE NEW_ALARM_VALUES_NUM                                                                         ⎫ 24
TRUNCATE NEW_ALARM_VALUES_CHAR                                                                        ⎭
```

*Figure 9*

| FILTER_ID | ATTR_ID | COND |
|---|---|---|
| 1 | Alarm Type | 41 |
| 1 | Alarm Type | 42 |

| RULE_ID | FILTER_ID | REQUIRED_MATCH_COUNT | ACTION |
|---|---|---|---|
| Rule1 | Filter1 | 2 | Action |
| Rule1 | Filter2 | 2 | Action |

*Figure 12*

SIGNAL MANAGEMENT SYSTEM FOR BUILDING SYSTEMS

BACKGROUND

The invention pertains to signals from automated systems and particularly to their management at the point of receipt. More particularly, the invention pertains to such signals in large networks of building systems, particularly systems with thousands of buildings related to very large enterprises.

SUMMARY

The invention is an approach for efficient signal management for automated systems, which may include building systems, industrial systems, medical systems, or any other system which reports signals that must be interpreted and acted on by a recipient (either human or machine).

The invention described herein provides a highly flexible method for defining all possible and desirable aspects of signal processing, including but not limited to the identification of signals for purposes of: 1) Assigning a specific person or class of human or computer handler to receive the signal, 2) assigning Priority Handling Instructions for the human or machine recipient, 3) assigning Maintenance Procedures instructions specific to a signal, 4) applying Suppression of a signal that does not provide important information, 5) applying Escalation to a signal that is aging within the system, 6) declaring sets of related signals that should be processed together, and 7) declaring sets of signals that together comprise a different meaning.

BRIEF DESCRIPTION OF THE DRAWING

FIG. 4 is a table of attribute ID's and structural entity types;

FIG. 5 is table of filter ID's and values;

FIG. 6 is a rule table;

FIG. 7 is a filter and character table;

FIG. 8 is a new alarm values table;

FIG. 9 is a filter script;

FIG. 11 is a filter and condition table;

FIG. 12 is a rule and action table; and

DESCRIPTION

Figure 1:
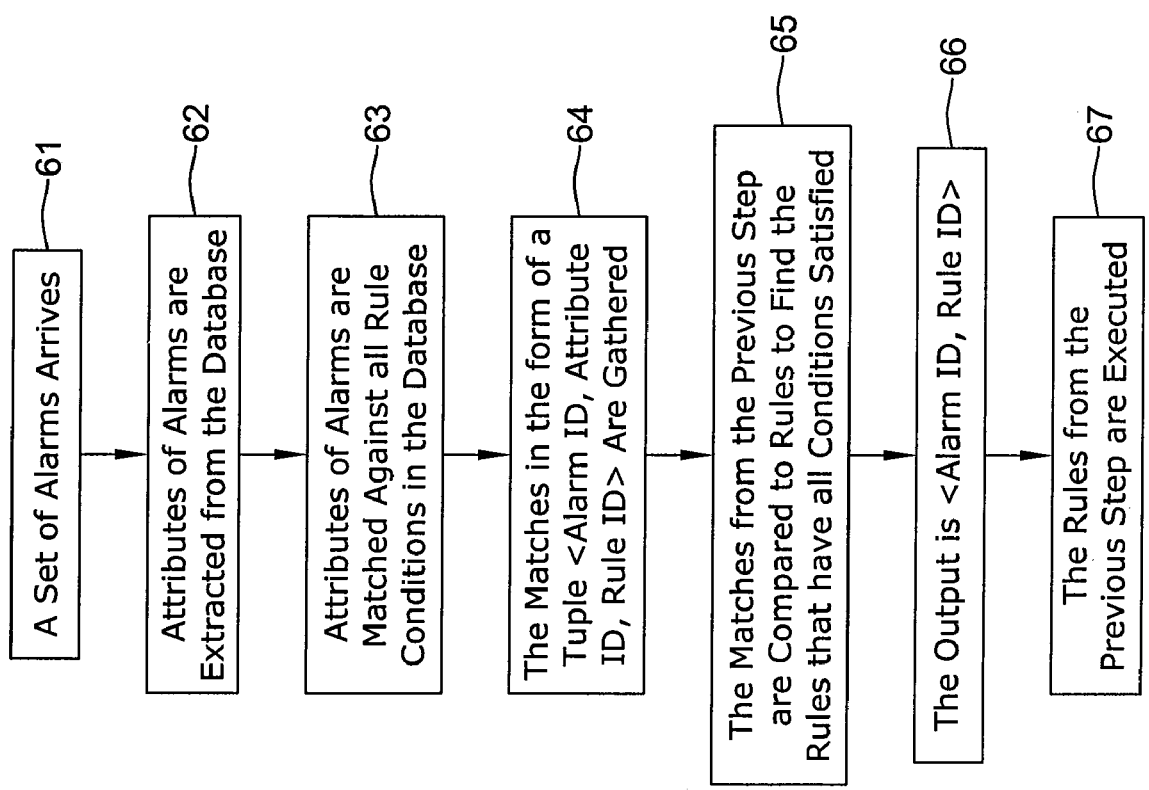
FIG. 1 is a block diagram of an operational sequence for an illustrative example of the present signal management system.

There exist event data processing centers that electronically receive a very large number of event signal instances, on the order of millions daily, with a diversity of signal parameters (i.e., formatted information included in the event data). The format and information content is based on multiple factors (e.g., a customer owning the site of an event), a type of event (e.g., missing data, a sensor high limit reached, a service of equipment overdue), and/or associated equipment or control system source), and thus the event signals vary in structure and amount of data. An event, alarm or entity may arrive at a system. An example entity unit may have information such as its model, location, name, last modification, and so on.

Previously, each incoming event was evaluated in a variety of methods and then disregarded or queued for processing. These methods were predefined and coded into the system, and based largely on the data included in the signal payload. When there is a way for human users to change the evaluation method, it falls into several categories: 1) To set parameters in each system to control features such as signal identification and signal priority, 2) to select the evaluation methods to be applied from precoded options, or 3) to write complex queries and filters in a data interaction language such as a structured query language (SQL). Option 1 is an unreasonable option when thousands of individual, disparate systems are involved, option 2 is limiting and option 3 is overly technical for many users.

The event signal flood requires fast management both within the initial input evaluation computation and within the human/computer event handling. Providing a configurable and flexible model for signal handling would aid in algorithm-based alarm mitigation, event queuing, and user interaction design for presenting event information, just to list a few of the many benefits. Alarms may be dealt with herein as an illustrative example of signals and their management.

A related-art implementation of alarm management systems generally maintains the configuration of alarms in the remote system that generates the alarm. This configuration is limited, and may be specific to the remote location. By providing an algorithm to recognize particular alarm features when the alarm is received, alarm characteristics may be added, or further refined to match the processing requirements of the receiving application. Additional alarm settings that apply to higher levels of the enterprise, such as enterprise-level alarm monitoring priorities may be added that modify the nature of the signal received from the remote system.

These signals are then, in many instances, retrieved by a direct query (as with SQL database queries) from a set of millions of signals, where only some subset has the required attributes, and those attributes may be assessed only through complicated querying. In other cases, the alarms are handled in first-in-first-out queue, and very little is done to identify which alarms are more urgent and should be higher in the queue than others. In all previously mentioned cases, most of the information available to signal management system, and to the end user, must come in the signal itself as part of the payload.

What is required is a way to translate signals from disparate systems into a common description, giving each of these potentially different signals a signature that may be processed in common fashion, regardless of source. These modified configuration parameters may then be used to alter signal handling in a manner that supports real-time evaluation of alarms at receipt.

The system and supporting algorithms must perform with a high degree of efficiency (on the order of milliseconds) to handle signal traffic at rates of five new events per second or more, in a system where signal volume may reach rates of one million alarms per day.

Instead of maintaining a configuration of every possible recognizable signal (e.g., as it is pre-configured at the issuing control device), one may design rules that inform the receiving system how to handle each alarm as a conjunction of disjunctive filter statements that apply to one or more of the signal attributes. (It should be noted that each Boolean expression that does not contain "not" can be reduced to that form.)

In order to enable consistent filtering across a range of disparate systems, the filtering mechanism must be generic and flexible. An example is the identification of the system components that are sources of signals, hereafter referred to as entities in the system. Typically, each control system vendor has a set of component descriptions that are specific to the engineering of that vendor's system (e.g., Unit, Module, Executive, C200, etc.). Entity filters in the present system will be decomposed to more generic forms than "Module Name" or "Unit Type". Instead of asking for all alarms with, for instance, Module="EHM 05", one may ask for alarms that have a key/value pair matching ModuleType and EntityName. If the filter is a disjunction, additional key value pairs may be used for this filter to handle the disjunction. Filter types are not necessarily based on specific fields; they may be based on data type and comparison type. Filter types may be added at any time without recompiling the code that evaluates the filters. A rule may be a collection of filters (i.e., a conjunction of disjunctive or filter statements).

In this manner, the system can be flexible to the addition of new types of systems, new alarm parameters, and new alarm sources, without requiring modification of the system that supports configuration, filtering or display of the signals.

In general, for each incoming alarm, one may match its attributes against existing filters to get matching filters. Then one may match the matching filters against all of the rules. Those rules that have all their filters satisfied may be used to handle the alarm.

It should be noted that instead of maintaining millions of records that represent all attribute combinations of all anticipated signals, one may maintain a significantly smaller configuration of rules. The present approach may be implemented either as part of the transactional database (where alarm and other data are stored) or as a stand-alone program.

The present approach relates to truth-table filter processing in a database of signals. A challenge of a filter application is that it may require very fast throughput of incoming alarms from tens of thousands of sites, and require very fast analysis of the nature of each alarm to support effective processing. The analysis may involve questions of who should view the alarm, what does it mean and how important it is. A standard method would be to apply filters to the database of alarms after they are received to extract the few that are relevant to a specific task. Such solution may appear ineffective in a database where millions of possible signal profiles must be evaluated to identify the relevant set in a timely manner (within seconds of the request).

A filter algorithm may apply appropriate alarm management rules to each alarm as it comes in, and take the values from one alarm and compare them to all of the alarm management rules criteria in one operation, to determine its correct handling. This filtering may be for very fast real-time processing of traffic based on pre-configured criteria. However, it may be noted that this algorithm does not serve bulk-processing or historical reporting needs using ad-hoc querying methods.

FIG. 1 is a block diagram of an approach for the present system. At block 61, a set of signals may arrive. At block 62, attributes of the signals may be extracted from the signals that arrived at a database. The attributes of the signals may be matched against the rule conditions in the database in block 63. Matches in the form of a tuple (i.e., alarm ID, attribute ID, rule ID) may be gathered in block 64. At block 65, matches from the previous step may be compared to rules to find the rules that have all conditions satisfied. The output may be an alarm ID and a rule ID in block 66. At block 67, the rules from the previous step or block 66 may be executed.

Figure 2:
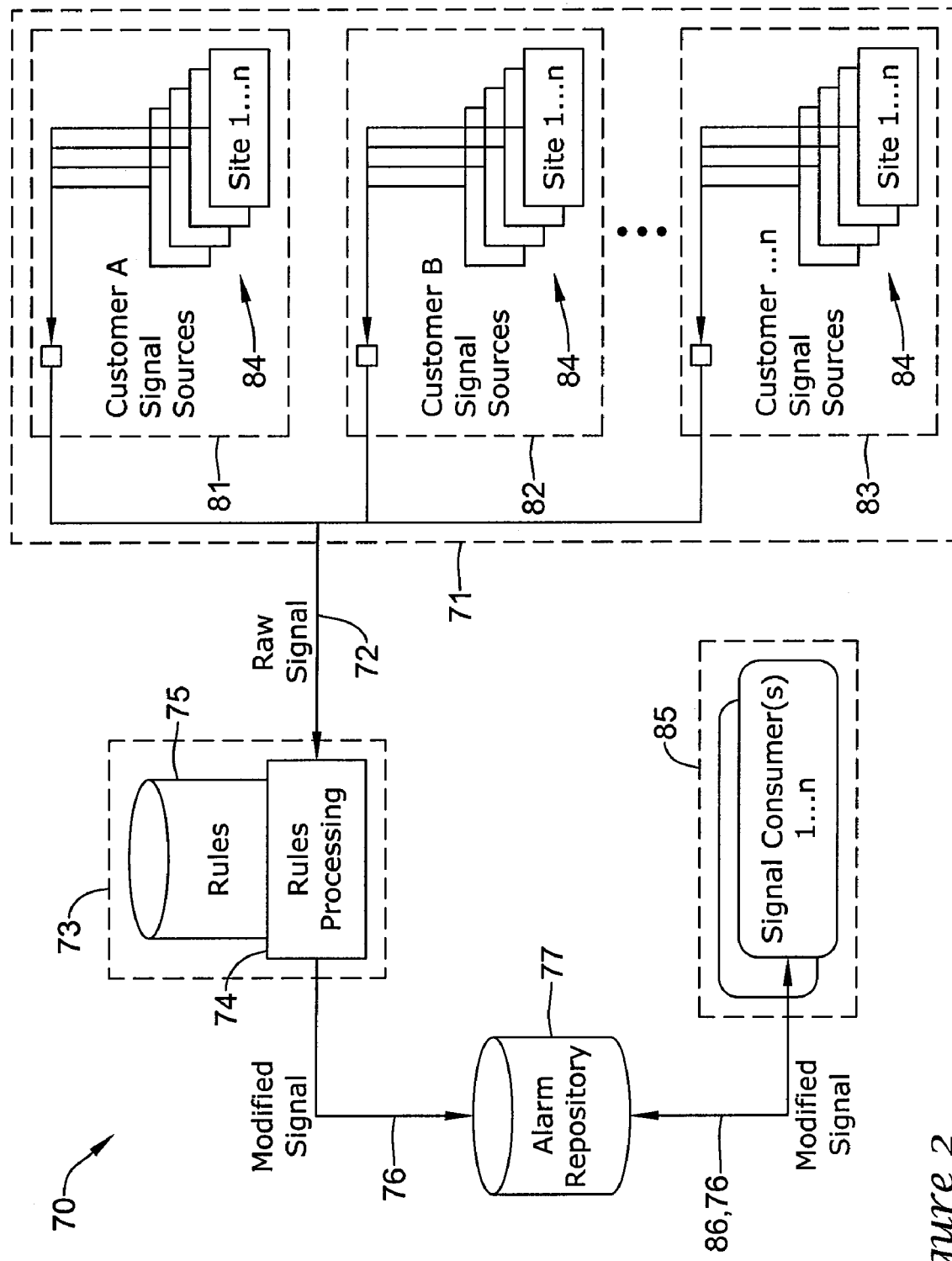
FIG. 2 is a diagram of an illustrative example of signal management system for multiple enterprises.

FIG. 2 is a diagram of an illustrative example of signal management system 70 for multiple enterprises. A source 71 of one or more raw signals 72 may be connected to a processor 73. Processor 73 may perform rules processing with a set of rules 75 on the raw signal to result in a modified signal 76. Modified signal 76 may go to an alarm repository for storage. The raw signal 72 may be processed by the processor into a modified signal in accordance with one or more rules. Source 71 may contain customer signal sources 81, 83 and 84, representing customer A, customer B and customers C through n, respectively. Sources of signals 72 may be from a group 84 of sites 1 through n. A number n of signal consumers 85 may send a request 86 to obtain and receive a modified signal 76. A number of customers in source 71, a number of sites of a customer, or a number of signal consumers may be represented by the term "n". The term "n" may represent a number of one or more.

Figure 3:
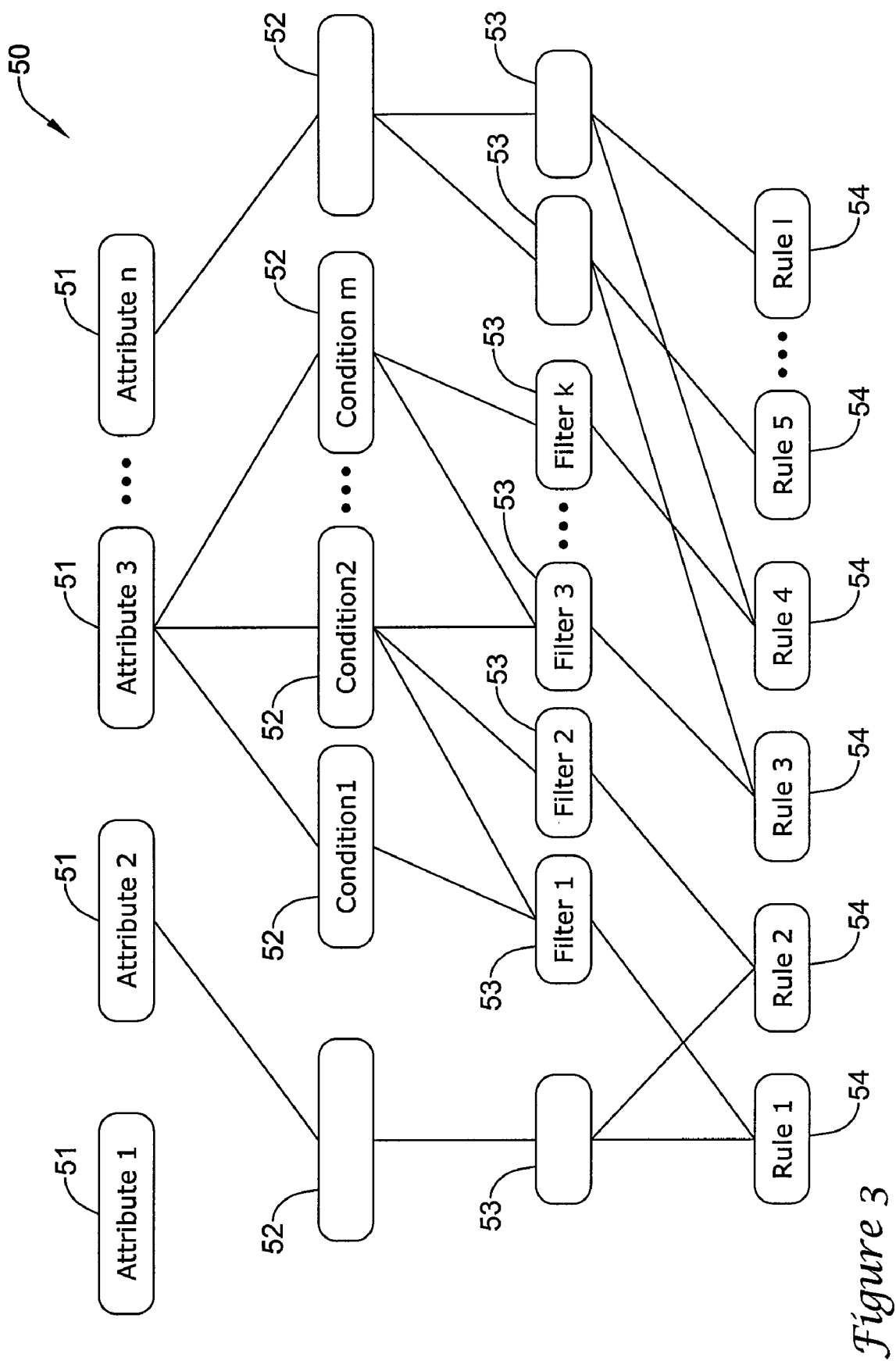
FIG. 3 is a diagram of an illustrative example of a network for signal management for building systems.

A network 50 of the system may be provided as shown in FIG. 3. An upper level may contain nodes corresponding to all of the attributes 51 on which at least one filter is defined. Attributes 51 may be populated from attributes on an incoming event or alarm. Each attribute may have a collection of conditions 52 which should be matched against an alarm record. A condition may be a tuple which could indicate the source identity, signal type (attribute) and value. Each condition 52 may belong to or be a component of one or more filters 53. It should be noted that the same condition 52 may be used in multiple filters 53 (for example, in two or more filters that define disjunctive conditions). Each filter 53 may have one or more conditions 52 (connected as components of a disjunction). The last level may contain rule nodes 54. Each rule node or rule 54 can have one or more filters 53 (i.e. a conjunction of filters which may be regarded as disjunctions). Among other attributes, each rule 54 may contain a number of all of the filters 53 that need to be matched as well as a temporary counter (initialized to zero each time an algorithm is run) which counts how many filters have been matched so far.

In order to find all of the rules 54 that need to be activated for a given alarm, for each attribute 51 one may find a condition 52 that matches the alarm's attribute value. At most, one condition 52 may be found. If a condition one 52 is found, then for all of the filters 53 which have that condition, one may find all of the rules 54 that have those filters 53. Each time a rule 54 is found, a counter of found filters 53 may be incremented. As the counter reaches the number of required filters 53, then a rule 54 may be activated.

Filter 53 types may be specified by an evaluation type algorithm. They may involve string equality, value equality and a range test. One filter 53 may be a disjunctive statement such as "alarm type=A or B or C". Another filter 53 may be a disjunctive statement such as "system type=1 or 2 or 3". A rule 54 may be a conjunction of disjunctions such as "rule 1=((alarm type=A or B or C) and (system type=1 or 2 or 3))". A conjunction may include more than two disjunctions, and a disjunction may have more or less than three designations indicating a type of an alarm, a system, or other item. The designations in a disjunction may indicate any other property of the alarm or system. Each these properties or types may have a truth value associated with it.

A disjunction is true if any one element of it is true. In other words, all of the elements of the disjunction need to be false for the disjunction to be false. As to a conjunction of disjunctions, if any disjunction is false, then the conjunction is false. In other words, all disjunctions need to be true for the conjunction to be true.

A question relative to alarm filtering may concern what the attributes look like. FIG. 4 shows an example table 11 of structural entity types relative to certain attributes. For instance, an entity having an ATTR_ID of 1, 2, 3, 4, 125, 345 may have a StructEntityType of Customer, Site, Unit, Module, Executive, and JACE, respectively.

For an illustrative example of a specific kind of filter, a user may say "all alarms with 'Module' named 'Foo' in the signal source path". So the filter would say all alarms with a key value pair "name|Foo on Attribute type 2". The SQL for this query may be "Where ATTR=2 AND COL_NAME='name' AND VALUE LIKE '% Foo %'".

A filter table may look like one designated FILTER_VAL_CHAR, as shown in FIG. 5. It may be an example filter table 12 where a FILTER_ID is associated with ATTR_ID, COL_NAME and VALUE. For instance, FILTER_ID of 1, 2, 3 may have an ATTR_ID of 1, 4, 2, a COL_NAME of Name, and a VALUE of Circuit, EHM 05 and RDXE M Slave, respectively. Numeric conditions may be stored separately from character conditions to simplify matching. Multi-select conditions may each get their own row. Each different data type/comparison type combination may go into a separate table (equality, range, . . . ), such as FILTER_VAL_NUM, FILTER_VAL_CHAR (such as one like table 12), and FILTER_VAL_RANGE.

FIG. 6 shows an example rule table 13 where a RULE_ID is associated with a FILTER_ID, an ORDER, a REQUIRED_MATCH_COUNT and an SQL_ACTION. For instance, a RULE_ID of 1, 1, 2, 123, 123, and FILTER_ID of 1, 2, 25, 1, 2 may have an ORDER, a REQUIRED_MATCH_COUNT of 2, 2, 1, 2, 2, and an SQL_ACTION of UPDATE Priority_FK=3, UPDATE Priority_FK=3, . . . , respectively. Rule table 13 may have a row for each filter. The order column is for priority where the highest priority match wins.

FIG. 7 shows an example filter table 14, FILTER_TBL_CHAR, where rows of, for instance, an ALARM_ID of 77570 may be associated with FILTER_ID of 1, 1, 1, 1, 1, 2, ATTR_ID of 10, 10, 10, 10, 10, 7, COL_NAME of Name, and VALUE of WI, MN, IA, IL, MI and Comp, respectively. A rule may be applied on an alarm group, i.e., all alarms with WI or MN or OH or IL or MI in the site name and with Comp in the load name.

FIG. 8 shows an example alarm table 15, NEW_ALARM_VALUES_CHAR, where rows of for instance an ALARM_ID 77570 may be associated with ATTR_ID of 11, 1, 10, 2, 100, 7, 99, COL_NAME of name, and VALUE of Circuit City, Master Control, N. Olmstead, OH, RT 2 COMP DISKS*, COOL 2, RT 2 COMP DISKS* and COOL 2, respectively. Multi-select filters may be OR conditions, that is, each individual condition gets a row in the table. Alarm values may be matched. A match on any one may result in a true result for that filter.

A general filter process may be noted. One may get an incoming alarm. Then one may grab its attributes and add them to the filter tables. Next one may do an entity-specific query that returns all attributes for that alarm in a generic format. Then one may write those attributes to the New_Alarm_Values tables. There should be a flexible and automatic method to determine which attributes are required for all of the active filters. Note that one should not collect attributes of which no one is using in a filter. This may be done for reasons such as efficiency.

The general filter process may continue with running the filters), finding the matches, and returning a set of rules to execute for each alarm. This approach may be a batch activity (i.e., once every few seconds). Some of the items in the process may require applying the right settings to the alarms and deleting the processed alarm values from the filter tables.

An illustrative example SQL script 20 for establishing and using an alarm filter is shown in FIG. 9. As to portion 21 of the script, one may ensure to get all of the matching numeric conditions. All of the matching string conditions of portion 22 should be obtained. One may identify each rule in portion 23 that has all of its required matches satisfied. Clean-up may be indicated at portion 24 of the script.

Further description of various aspects relating to a filter processing algorithm may be provided. It may be noted that some of the tables indicated or used in this description are not necessary for implementation of the present system. In a large system configuration with multiple enterprises, such as in a large, centralized monitoring center, there will likely be relatively few rules per subscribing customer (i.e., about ten signal priority rules, about ten signal suppression rules, and about five signal routing rules). Even if there are many such customers, and thousands of systems, and if these rules have many filter conditions, they would likely number only a few hundred, or a few thousand individual comparisons. Therefore, the queries and joins of the truth value tables for the set of configured rules may be processed on relatively small data sets which grow significantly more slowly than the overall signal volume.

Although the present approach imposes a processing load when alarms are received, it may eliminate a number of troublesome maintenance issues and the need to run several background processes that would be required to support other approaches. It eliminates the need for the system to model alarm handling rules for specific identified signals a priori, which would entail modeling all such anticipated signals, amounting to multiple millions of configuration parameters in a very large network of systems. This is wasteful of disk space, working processor memory, and processing time, and troublesome to maintain over time.

The present solution is extremely flexible to the addition of new types of rules. As with the separation of the string and numeric filter tables, additional tables for dates may also be included. With minor modification, the logic may be modified to handle "NOT" conditions as well. These additions would not significantly affect performance.

The present solution may also handle nested conditions. A nested condition is simply a larger conjunction. For instance, if there are three hierarchical rules, rule 1, rule 2 and rule 3, where rule 3 is at the third level, to satisfy rule 3, all of the filter conditions at each level need to be true.

A number of base assumptions may be made. First, each filter deals with only one attribute. A condition on the filter may be a single equality condition or disjunctive condition. Second, each rule is a conjunction of filters. Third, the database is not necessarily normalized for efficiency reasons. Fourth, where appropriate, there is a note that may describe constraints on the attributes. Fifth, the approach discussed herein may focus on an evaluation of filter conditions, and identification of rules to be executed. The rules may be applied once identified. Sixth, the example may store intermediate results in the tables. However, the code may be changed so that the intermediate results are stored in memory.

Figure 10:
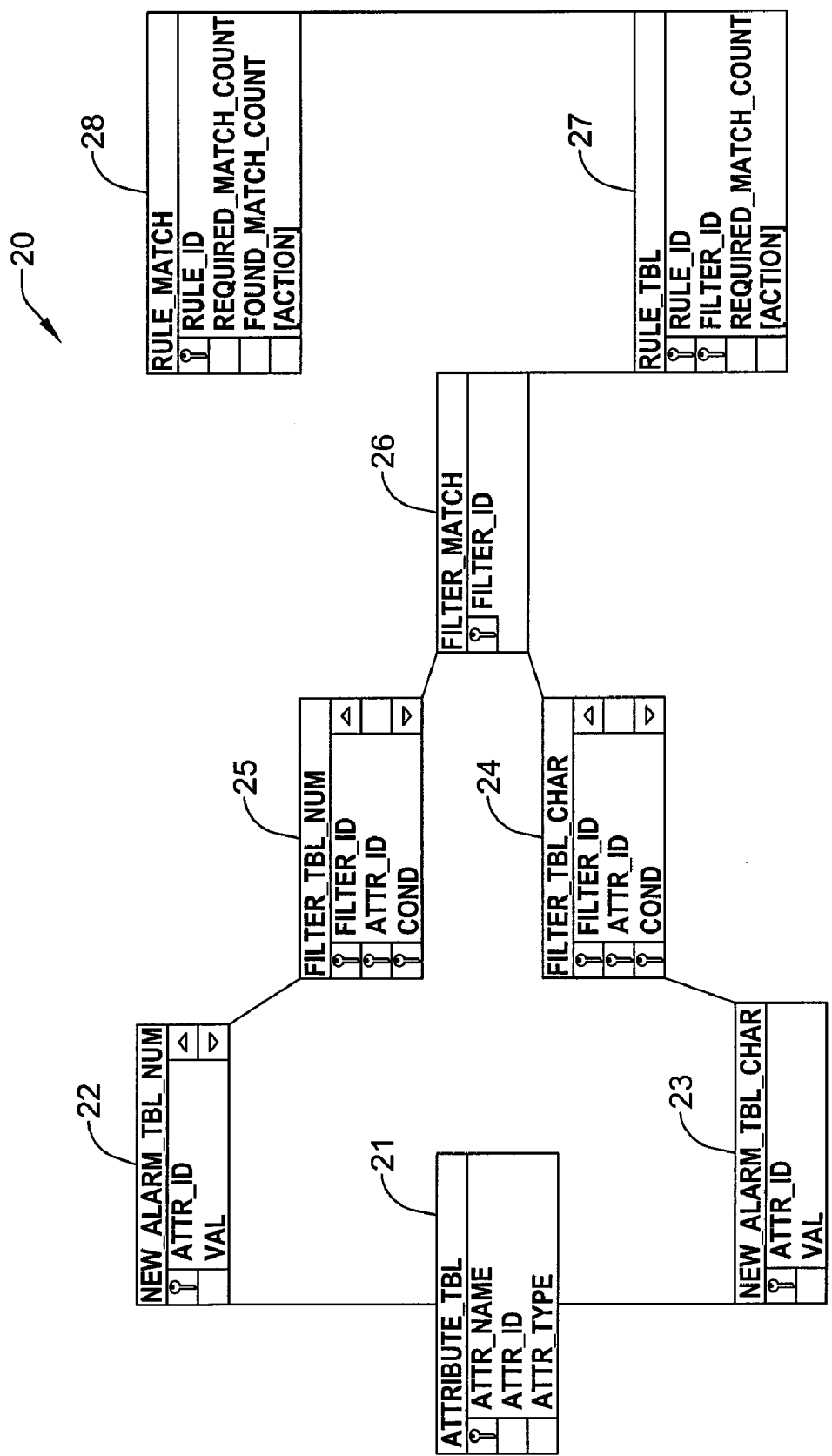
FIG. 10 is a database schema for a one alarm at a time solution.

A solution of processing one signal at a time may be noted in FIG. 10. A solution of processing multiple signals at one time may be noted in FIG. 13. The database schema 20 (for one alarm at time solution) is noted first. Some of the tables used in the schema may hold temporary results; however, they may be included for illustrative purposes only. For a more efficient solution, the intermediate results should be stored in memory. This solution may be easier to understand by first looking at the solution with temporary tables.

Each incoming alarm may be represented by a set of rows in NEW_ALARM_TBL_NUM 22 and/or NEW_ALARM_TBL_CHAR 23 depending on the type of attribute. If the attribute is numeric then it should be stored in NEW_ALARM_TBL_NUM 22; if the attribute is a string then it should be stored in the NEW_ALARM_TBL_CHAR 23. This may allow all of the rules in each table to be processed using the same syntax. The date ranges on suppression rules may be handled in a similar manner using a third structure specific to numeric ranges, e.g., NEW_ALARM_TBL_RANGE (not shown).

To identify how to store the attributes and their values ATTRIBUTE_TBL 21 can be used. It should be noted that there is one-to-one correspondence between ATTR_NAME and ATTR_ID. In other words, ATTR_ID is a secondary key of ATTRIBUTE_TBL 21. The difference is that ATTR_ID is numeric and thus may make it more efficient for query processing.

In the interests of efficiency, the following may be used. First, one should store only attribute information of those attributes that are used in the filter. For example, alarm ID is not necessarily used in the filter and therefore should not be stored in the ATTRIBUTE_TBL 21 (and as a result in NEW_ALARM_TBL_NUM 22 or NEW_ALARM_TBL_CHAR) 23. Second, the number of rows in NEW_ALARM_TBL_CHAR 23 (and FILTER_TBL_CHAR 24) should be minimized. For example, if there is one-to-one correspondence between Alarm Name and Alarm Type, then the filter should be stored as a numeric filter on the Alarm Type Key (not a character filter).

In both NEW_ALARM_TBL_* 22, 23, ATTR_ID is an identifier of the attribute of the alarm; VAL is the value of this attribute. So, if an alarm has 10 numeric and 5 character attributes, then when an alarm comes in one may have 10 rows in the NEW_ALARM_TBL_NUM 22 and 5 rows in the NEW_ALARM_TBL_CHAR 23, one for each attribute. This assumes that all 15 attributes are used in at least one filter. However, if only a sub-set of attributes is used in the set of existing filters, only those should be stored in the NEW_ALARM_TBL_* 22, 23 (for performance reasons). NEW_ALARM_TBL_* 22, 23 may hold each new alarm temporarily until it is matched to all of the rules. Then the rows related to that alarm should be deleted from the table.

One may note that in the present approach, one may be storing (temporarily) all of the attribute value pairs in the table. For performance reasons, the approach may be changed to store each such pair in the memory.

FILTER_TBL_NUM 25 may hold all of the filters on numeric attributes. FILTER_TBL_CHAR 24 may hold all of the filters on string attributes. ATTR_ID may be the ID of the attribute for which one would be testing the condition (COND).

It may be noted that the FILTER_ID should be globally unique. It means that if one filter tests a string attribute and another one tests a numeric attribute, the filters should not have the same ID's. (The FILTER_ID is likely to be implemented as a foreign key to existing filter tables, which already enforce unique identification.)

If the test is disjunctive, multiple rows may be produced and each row will have the same FILTER_ID/ATTR_ID pair, but a different COND, as shown in table 31 of FIG. 11. So if one has a filter 1 that says AlarmType=41 or 42, one may have 2 rows in FILTER_TBL_NUM table 25. This may allow one to store disjunctive tests. When an alarm record is matched against FILTER_TBL_NUM table 25, then one or zero conditions may match on the attribute of the filter.

FILTER_MATCH 26 may be a temporary table which stores filter ID's that successfully matched attribute values on the incoming alarm. Filter ID's from both FILTER_TBL_NUM 25 and FILTER_TBL_CHAR 24 may be stored in FILTER_MATCH 26. This is why the filter_ids should be unique across different attribute types.

RULE_TBL 27 may store all of the rules. So if the rule says Filter 1 and Filter 2 then Rule 1, then one would have 2 rows in RULE_TBL 27, as illustrated in a diagram 32 of FIG. 12 The attribute REQUIRED_MATCH_COUNT in RULE_TBL 27 may indicate how many conjunctions (filters) should be matched in order for rule to fire. So if the rule has 2 filters, REQUIRED_MATCH_COUNT is 2. ACTION is the action that should be taken if the alarm matches the rule. This could be an executable SQL statement such as "Set Priority_FK=3."

Additional columns may be included in RULE_TBL 27 to resolve potentially overlapping conditions, or to arbitrate other dependencies. For example, if an alarm satisfies more than one priority rule, only the rule with the highest priority should be applied. (A customer-specific default priority rule may be stored in the table along with all other rules.)

There may be a one-to-one correspondence between the rule ID and required_match_count as well as the rule ID and action. It may also be emphasized that the required_match_count is equal to the number of rows with the same rule ID (number of filters to match).

RULE_MATCH 28 may be a temporary table that holds all of the rules that had at least one filter match. FOUND_MATCH_COUNT in table 28 may be the number of matched filters. If all of the filters in the rule matched, then FOUND_MATCH_COUNT should be equal to REQUIRED_MATCH_COUNT and the rule should fire. Otherwise, all of the conditions of the rule would not be satisfied and the rule should not fire.

A procedure may be provided to find all the rules that should be fired. It may be assumed that both tables NEW_ALARM_TBL_CHAR 23 and NEW_ALARM_TBL_NUM 22 have been populated. First, all of the all matching filters may be found in the following.

SELECT FILTER_ID INTO FILTER_MATCH
FROM FILTER_TBL_NUM
INNER JOIN NEW_ALARM_TBL_NUM
ON
FILTER_TBL_NUM.ATTR_ID=NEW_ALARM_TBL_NUM.ATTR_ID AND
FILTER_TBL_NUM.COND=NEW_ALARM_TBL_NUM.VAL
SELECT FILTER_ID INTO FILTER_MATCH
FROM FILTER_TBL_CHAR
INNER JOIN NEW_ALARM_TBL_CHAR
ON
FILTER_TBL_CHAR.ATTR_ID=NEW_ALARM_TBL_CHAR.ATTR_ID AND FILTER_TBL_CHAR.COND LIKE NEW_ALARM_TBL_CHAR.VAL

Then all of the rules that have those filters may be found and that all of the required filters may be verified as matched, in the following.

SELECT RULE_ID, REQUIRED_MATCH_COUNT, COUNT(RULE_ID) AS FOUND_MATCH_COUNT, ACTION INTO RULE_MATCH
FROM RULE_TBL
INNER JOIN FILTER_MATCH
ON
RULE_TBL.FILTER_ID=FILTER_MATCH.FILTER_ID

```
GROUP BY RULE_ID, REQUIRED_MATCH
SELECT RULE_ID, ACTION
FROM RULE_MATCH
WHERE
REQUIRED_MATCH_COUNT=FOUND_MATCH_COUNT
```

Clean-up may be effected in the following.

```
TRUNCATE TABLE FILTER_MATCH
TRUNCATE TABLE RULE_MATCH
TRUNCATE TABLE NEW_ALARM_TBL_NUM
TRUNCATE TABLE NEW_ALARM_TBL_CHAR
```

A procedure to file all of the rules that should be fired (without storing intermediate results in the tables) may be effected. The following solution may eliminate the need to store intermediate results in the FILTER_MATCH 26 and RULE_MATCH 28 tables.

```
         SELECT RULE_ID, ACTION
         FROM (
           SELECT RULE_ID, REQUIRED_MATCH_COUNT,
           COUNT(RULE_ID) AS
           FOUND_MATCH_COUNT, ACTION
           FROM RULE_TBL
           WHERE RULE_TBL.FILTER_ID =
             (SELECT FILTER_ID INTO
             FROM FILTER_TBL_NUM
             INNER JOIN NEW_ALARM_TBL_NUM
             ON FILTER_TBL_NUM.ATTR_ID =
             NEW_ALARM_TBL_NUM.ATTR_ID
             AND FILTER_TBL_NUM.COND =
             NEW_ALARM_TBL_NUM.VAL
             UNION ALL
             SELECT FILTER_ID INTO
             FROM FILTER_TBL_CHAR
             INNER JOIN NEW_ALARM_TBL_CHAR
             ON FILTER_TBL_CHAR.ATTR_ID =
             NEW_ALARM_TBL_CHAR.ATTR_ID AND
             FILTER_TBL_CHAR.COND
             LIKE NEW_ALARM_TBL_CHAR.VAL)
           GROUP BY RULE_ID, REQUIRED_MATCH, ACTION)
         WHERE FOUND_MATCH_COUNT =
         REQUIRED_MATCH_COUNT
         TRUNCATE TABLE NEW_ALARM_TBL_NUM
         TRUNCATE TABLE NEW_ALARM_TBL_CHAR
```

This query may be further optimized by using indexes.

Figure 13:
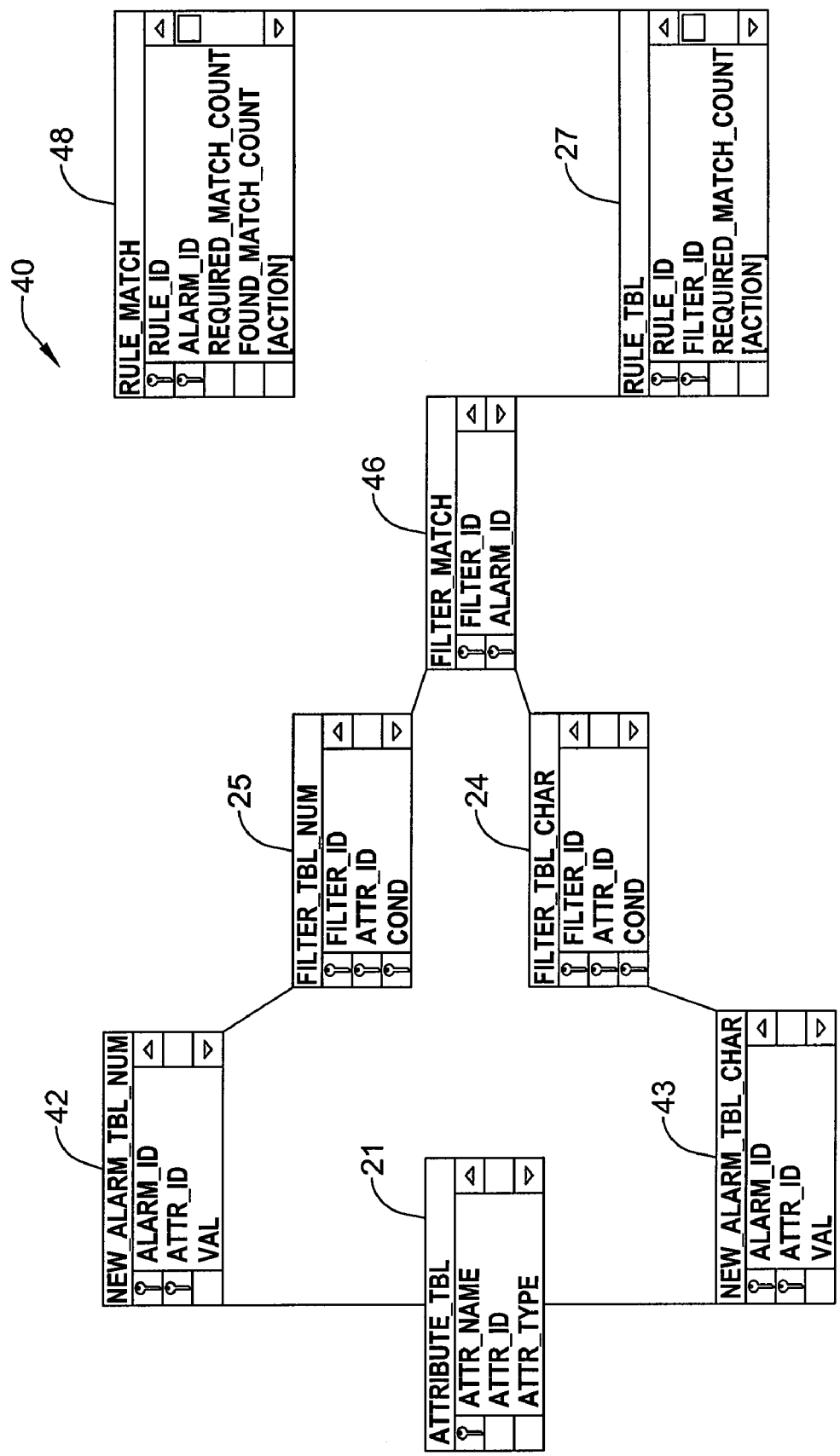
FIG. 13 is a database schema for a multiple alarms at a time solution.

FIG. 13 is a diagram or schema 40 of a solution sketch where multiple queries are stored at a time. The difference between schema 40 and schema 20 (FIG. 10) is that one has an additional attribute (ALARM_ID) in the following tables: NEW_ALARM_TBL_NUM 42, NEW_ALARM_TBL_CHAR 43, FILTER_MATCH 46 and RULE_MATCH 48.

The query to find all matching alarms may be indicated by the following.

```
SELECT RULE_ID, ALARM_ID, ACTION
FROM (
  SELECT RULE_ID, ALARM_ID, REQUIRED_MATCH_COUNT,
  COUNT (RULE_ID) AS FOUND_MATCH_COUNT, ACTION
  FROM RULE_TBL,
    (SELECT FILTER_ID INTO
    FROM FILTER_TBL_NUM
    INNER JOIN NEW_ALARM_TBL_NUM
    ON FILTER_TBL_NUM.ATTR_ID =
    NEW_ALARM_TBL_NUM.ATTR_ID
    AND FILTER_TBL_NUM.COND =
    NEW_ALARM_TBL_NUM.VAL
    UNION ALL
    SELECT FILTER_ID INTO
    FROM FILTER_TBL_CHAR
    INNER JOIN NEW_ALARM_TBL_CHAR
    ON FILTER_TBL_CHAR.ATTR_ID =
    NEW_ALARM_TBL_CHAR.ATTR_ID AND
    FILTER_TBL_CHAR.COND
    LIKE NEW_ALARM_TBL_CHAR.VAL) FILTER_MATCH
  WHERE RULE_TBL.FILTER_ID =
  FILTER_MATCH.FILTER_MATCH
  GROUP BY RULE_ID, ALARM_ID,
  REQUIRED_MATCH, ACTION) WHERE
FOUND_MATCH_COUNT = REQUIRED_MATCH_COUNT
```

This query may be re-written as non-correlated sub-query for further efficiency.

The present algorithm may be implemented in code as indicated in the following. This approach may be considered if the database solution described herein has an undesirable affect on throughput. For coding the algorithm, one may look to network 50 in FIG. 3. A pseudo-code of the algorithm may be as in the following.

```
For each attribute
   condition = find_matching_condition(attribute, value)
   if condition
      for each filter = next_filter(condition)
         for each rule = next_rule(filter)
            increment(rule.filter_count);
            if (rule.filter_count eq rule.required_filter_count)
               active_rules.add(rule)
            end
         end
      end
   end
end
```

The function find_matching_condition should be implemented as an efficient search, so that the time to find the matching condition is not linear. An example of a more efficient search than a simple loop would be a binary search (O(ln n)). This search assumes that the values (conditions) are sorted. Other search strategies (detailed in various algorithm books) may be employed. An appropriate storage data structure should be used. In order for the noted algorithm to work for multiple alarms, an outer-loop (for each alarm) may be used.

In sum, the signal management system may include one or more signal sources of one or more customers, a processor for processing signals from the one or more signal sources in accordance with a set of rules, and a repository or memory for storing signals from the processor. The signals in the repository may be accessible. The processor may have an attribute extractor connected to a database, an attribute matcher connected to the attribute extractor, and a match comparator connected to the attribute matcher. The database may be for holding the rules, among other things. The attribute extractor may be for extracting attributes of signals. The attribute matcher may be for providing matches of attributes of the signals with conditions of the rules. The matches may be in the form of a tuple comprising a signal ID, an attribute ID and a rule ID. The match comparator may be for comparing the matches from the attribute matcher to the rules to determine which ones satisfy conditions of the rules. A rule or rules indicated by output items of the match comparator may be executed. Output items from the match comparator may have a signal ID and a rule ID. An attribute may have a set of one or more conditions which can be matched against a signal record. A signal, for instance, may be an alarm. Signal management, for example, may be used in a building control or automation system.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. A signal management system for managing signals from one or more customers of an event data processing center comprising:
   one or more signal sources associated with the one or more customers of the event data processing center, wherein the one or more signal sources include a building system of at least one building at one or more customer sites;
   a processor for processing signals from the one or more signal sources, in accordance with a set of rules, wherein the processor determines the set of rules by using one or more matched filters, wherein the filters are matched to one or more attributes of the processed signal based on conditions associated with the attributes; and
   a repository for storing the processed signals from the processor; and
   wherein:
   a rule is a conjunction of filters;
   a filter is a disjunction of conditions;
   the signals in the repository are accessible; and
   the signal management is for building control.

2. The system of claim 1, wherein the processor comprises:
   an attribute extractor connected to a database;
   an attribute matcher connected to the attribute extractor; and
   a match comparator connected to the attribute matcher; and
   wherein the database is for holding the rules.

3. The system of claim 2, wherein the attribute extractor is for extracting attributes of signals.

4. The system of claim 3, wherein the attribute matcher is for providing matches of attributes of the signals with conditions of the rules.

5. The system of claim 4, wherein the matches are in the form of a tuple comprising a signal ID, an attribute ID and a rule ID.

6. The system of claim 4, wherein the match comparator is for comparing the matches from the attribute matcher to the rules to determine which ones satisfy conditions of the rules.

7. The system of claim 6, wherein:
   an output from the match comparator comprises a signal ID and a rule ID; and
   a signal is an alarm.

8. The system of claim 6, wherein a rule or rules indicated by the output of the match comparator are executed.

9. A method for signal management comprising:
   receiving signals at an event data processing center, wherein the signals are received from one or more customers of the event data processing center;
   extracting attributes of signals;
   matching the attributes having one or more conditions against conditions of rules;
   determining the conditions which match with the attributes; and
   selecting rules having their conditions matched; and
   wherein:
   the processor determines the set of rules by using one or more matched filters, wherein the filters are matched to one or more attributes of the processed signal based on conditions associated with the attributes;
   a rule is a conjunction of filters;
   a filter is a disjunction of conditions; and
   signal management is for a building control system.

10. The method of claim 9, wherein:
    an output indicating rules from the selecting comprises items; and
    each item comprises a signal ID and a rule ID.

11. The method of claim 10, further comprising executing the rules indicated by the items.

12. The method of claim 11, wherein:
    a condition is a tuple; and
    a tuple comprises a signal ID, an attribute ID and a rule ID.

13. The method of claim 12, wherein
    a signal is an alarm.

14. A system for signal management, comprising:
    a processor at an event data processing center comprising:
       an input for receiving signals from one or more signal sources associated with one or more customer sites;
       an attribute extractor for extracting attributes of signals from a database;
       an attribute matcher for obtaining matches of the attributes of signals against rule conditions in the database; and
       a match comparator for comparing the matches with rules to determine rules having their conditions satisfied by the matches; and
    wherein:
    the processor determines the set of rules by using one or more matched filters, wherein the filters are matched to one or more attributes of the processed signal based on conditions associated with the attributes;
    a rule is a conjunction of filters;
    a filter is a disjunction of conditions; and
    signal management is for building control.

15. The system of claim 14, wherein a match is in a form of a tuple comprising a signal ID, an attribute ID and a rule ID.

16. The system of claim 15, wherein the third mechanism is further for providing an output of items comprising a signal ID and a rule ID.

17. The system of claim 16, further comprising a fourth mechanism for executing rules as determined by the output of the third mechanism.

18. The system of claim 17, wherein each attribute has a set of one or more conditions.

19. The system of claim 18, wherein:
    the set of one or more conditions is matched against a signal record; and
    a signal is an alarm.

* * * * *